May 27, 1952     A. L. JACKSON     2,598,548
MEAT PROCESSING MACHINE
Filed July 9, 1948     6 Sheets-Sheet 1

INVENTOR.
ALDRICH L. JACKSON
BY
ATTORNEY

May 27, 1952     A. L. JACKSON     2,598,548
MEAT PROCESSING MACHINE
Filed July 9, 1948     6 Sheets-Sheet 4

*INVENTOR.*
ALDRICH L. JACKSON
BY 
ATTORNEY

May 27, 1952  A. L. JACKSON  2,598,548
MEAT PROCESSING MACHINE
Filed July 9, 1948  6 Sheets-Sheet 5

INVENTOR.
ALDRICH L. JACKSON
BY
ATTORNEY

Patented May 27, 1952

2,598,548

UNITED STATES PATENT OFFICE 2,598,548

MEAT PROCESSING MACHINE

Aldrich L. Jackson, Minneapolis, Minn., assignor to Hobart-Federal Engineering Corporation, Minneapolis, Minn., a corporation of Minnesota Application July 9, 1948, Serial No. 37,776

3 Claims. (Cl. 17—26)

My invention relates to a meat tenderizing machine wherein a tenderizing unit is provided through which the meat is adapted to be passed.

A primary feature resides in providing means for receiving the tenderizing unit which includes a casing adapted to house an electric motor and a transmission unit operated by the motor, the motor and transmission unit being concealed within the casing. The casing is adapted to receive the tenderizing unit into operating position to contact the transmission unit by holding the unit with one end resting on a receiving shelf in the casing and rocking the other end into position in the casing where a keystone-like shoulder means receives the end of the unit as it is rocked into operating position. Thus the tenderizing unit is locked in place. The tenderizing unit can be removed in the same manner by a rotating movement which lifts one end of the unit out of the keystone-shaped recess and as this end of the unit is raised the other end of the unit is released from the driving transmission. It is an important feature to provide a means for supporting the tenderizing unit so that it can be engaged by the hand of the operator to lift it out of operating position by a rotating movement or it can be re-inserted into operative position by a rotating movement. Thus I provide an easy means of handling the tenderizing unit so that the free end of the same can be lifted from a locking recess (which is key-shaped) and through this lifting movement of the free end of the unit, the other end of the unit is disengaged from the key clutch of the transmission unit.

It is also a feature to provide a tenderizing and processing unit for meat, which is composed of two sections, each of which is provided with a shaft upon which are mounted a series of tenderizing knives held spaced apart, the knives of the respective sections overlapping and fitting between each other when the sections are assembled in a unit. A feature of the tenderizing unit which is of primary importance resides in a means of hinging the sections of the unit together on one end on a key which permits the sections to be rotated on the key toward and away from each other in separating the sections entirely from each other and which holds the sections in line with each other on one end and leaves the other end of the sections free to be separated or to be moved adjacent each other against bearing faces of the frames of the sections which hold the same in line when the sections are held as a unit within the supporting casing.

A further feature resides in means for supporting one section in the supporting casing so that it can be operated by the power means and permit the operator to sharpen the blades. Either section of the unit can be held separately in the recess of the supporting casing or the sections may be held as a unit when in processing position in the casing. The separable sections of the tenderizing unit permit each section to be thoroughly cleansed when separated from the other section in addition to the advantage of operating either one of the sections individually in the casing as just described.

A further important feature of my tenderizing and processing machine resides in the casing which is formed with a central recess having a bottom forwardly inclined wall, the ends of the recess joining this wall to form a smooth closed casing at each end of the recess which provides the recess with a smooth surface throughout its entire form which can be readily cleansed when the tenderizing unit is removed from the casing. I also provide a hinged cover for closing this central recess and forming a protective means over the top and front of the tenderizing unit when this cover is closed. However, the forwardly inclined wall is spaced from the lower free end of the cover to provide a chute-like opening out of which the tenderized meat drops when it leaves the tenderizing unit. The tenderizing unit is formed with guiding means in the form of strippers. The cover is formed with a longitudinal slot, and depending from the same within the cover and formed integral therewith is a flange which forms a chute-like opening extending toward the tenderizing unit, which guides the meat to the tenderizing unit.

A feature of the tenderizing unit resides in a pair of handles, one of which is formed on the frame of each section of the unit, and these handles form guides to direct the meat to the processing rollers. In addition, these handles form gripping means which the operator engages to remove or insert the tenderizing unit.

The chute of the cover directs the meat to be processed to the chute-like passageway formed by the handles of the unit, and as the processed meat passes through the tenderizing unit the floating stripper members which have ends projecting beyond the tenderizer blades form guides to direct the processed meat onto the inclined shelf which discharges the same out of the machine.

It is also a feature to provide a unit frame for supporting the electric motor and power transmission unit within the casing. This frame is attached to the casing below the recess by bolts which also support the hinge of the cover.

A further feature resides in providing a casing formed of a single piece which conceals the electric motor and transmission unit and wherein the central recess is formed to receive the tenderizing unit with shoulders at each end of the recess upon which the ends of the tenderizing unit rest. One of the shoulders receives the end of the tenderizing unit first and the other of the shoulders receives the free end of the tenderizing unit as it is rocked into operative position in the casing. In forming the casing of a single piece of material I have provided a very desirable support for the tenderizing unit, which permits the unit to be removed by lifting the free end of the same and rotating it out of engagement with the clutches of the power unit. Then the recess may be wiped clean and thereby a sanitary support and casing for my machine is provided which is highly desirable in a machine of this character used for processing or tenderizing meat, where one of the first essentials is cleanliness.

The simple form of my casing with the central recess for receiving the tenderizing unit permits the processing or tenderizing unit to be rotated into place ready for operation. The unit may be lifted out of operating position by raising the free end thereof which is opposite the driving clutches and rotating the unit up out of the machine.

The central recess formed in the casing has formed integrally therewith in the end walls of the recess the guiding shoulders for the ends of the processing unit. This is important in forming a simplified construction which provides smooth clean surfaces without any cracks or joints which could not be easily cleaned. Normally the one-piece casing is white enamelled like other fixtures in a butcher shop. Thus the entire outer surface, including the recess in the casing and the shoulders at the ends of the same, is smooth and finished with an enamelled surface which is sanitary and may be easily cleansed when the unit is removed.

The features and objects of this invention will be more clearly and fully hereinafter defined.

In the drawings forming a part of this specification.

My meat tenderizing machine A is composed of an outer housing 10 constructed of metallic or nonmetallic material. A recess 11 is formed in the outer housing 10 adapted to receive the tenderizing unit B which will be fully hereinafter defined. The unit receiving recess 11 has a shelf 12 formed longitudinally of the rear portion thereof to which is hinged the cover portion 13 which is virtually flush with the outer casing and completely covers the tenderizing unit B when the same is closed for operation of the machine A. The cover 13 is formed with a meat receiving slot 13' on the top portion thereof.

I provide a one-piece integral frame 14 which is secured to the under side of the shelf 12. The frame 14 is composed of the vertical members 15 and 16 which are joined at the top by a horizontal member 14' which extends under the shelf 12 and is secured thereto by the bolts 12'. The central brace member 17 and the bottom longitudinal member 18 connect the members 15 and 16. The bottom surfaces of the members 15 and 16 are positioned slightly above the bottom edges of the outer cover or casing 10. The vertical or upright member 16 supports the gear housing 19. The gear housing unit 19 contains a series of gears which are driven by the motor 20 through the flexible coupling 21. The series of gears within the gear housing 19 are adapted to drive the clutches or couplers 22 which are cup-like in shape and have engaging teeth 23 formed on the rims thereof. The recess 11 formed in the outer casing 10 is finished off in the upper portion thereof by the end wear or striker metal plates 24 and 25 which are secured by the bolts 26 and 27 respectively. The bolts 26 and 27 are secured into the upright end walls 24' and 25' respectively. The plate 24 is formed with the inclined shoulders 28 and 29. The plate 25 is formed with the shoulders 30 and 31. Between the shoulders 30 and 31 is formed a horizontal shelf 32. At the base of the plate 24 I provide a horizontal shelf 33 formed at the lower ends of the inclined shoulders 28 and 29.

The clutches or couplers 22 are recessed in the lower thickened portion of the plate 25 and virtually flush with the surface thereof. A longitudinal wall portion 34 inclines from the shelf portion 12 downwardly to an arcuated portion beneath the unit B and then slants downwardly toward the front of the casing 10 to form a meat chute surface 35, all of which is part of the bottom of the recess 11 hereinbefore mentioned formed in the outer casing 10.

The bolts 12' support the lower plate 36 of the hinge 37. The upper plate 38 of said hinge is secured by the bolts 39 to the cover 13. The front free end 40 of the cover 13 may be engaged to lift the cover by inserting the hand in the lower end of the recess 11 adjacent the wall 35 of the bottom of the recess. When the cover 13 is raised into the position illustrated in Figure 1, the sectional tenderizing unit B is exposed. This permits the operator to engage the tenderizing unit to lift it from the recess 11 or re-insert it therein.

Figures 1, 2, 4, 5:
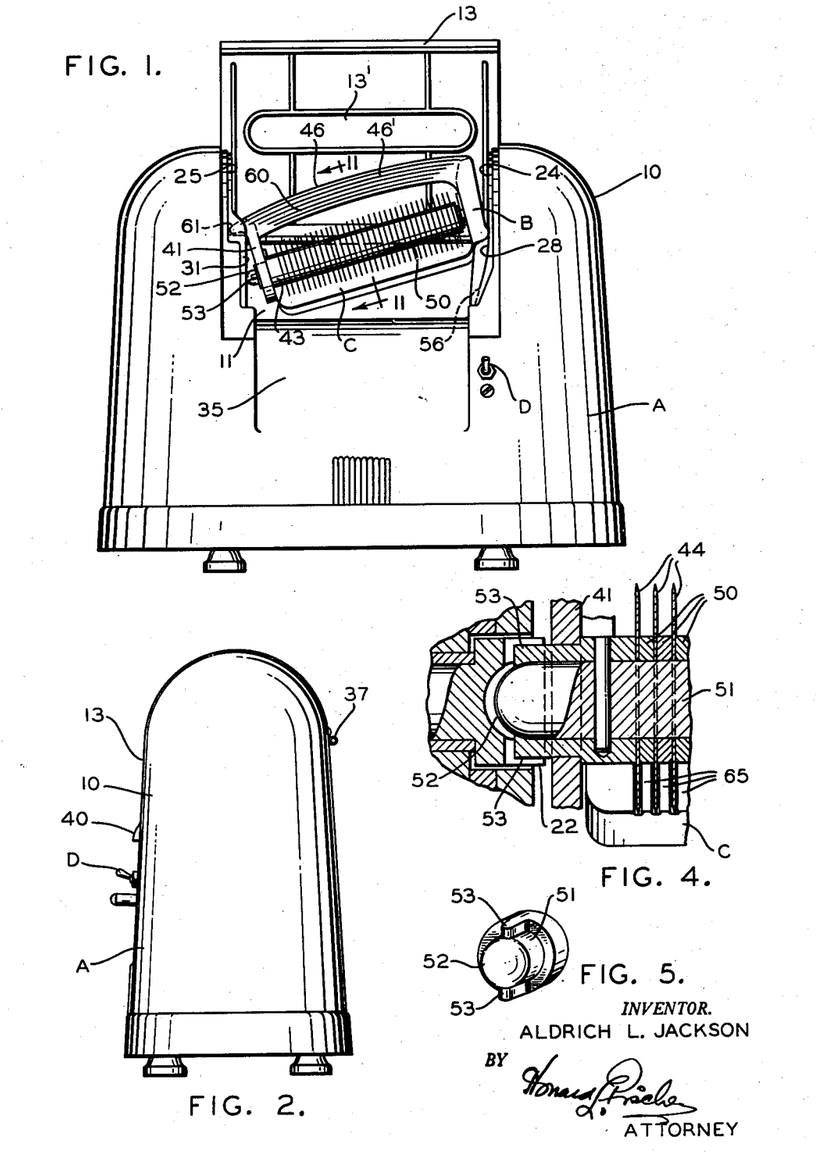
Figure 1 is a front view of my meat tenderizing machine showing the cover elevated and the tenderizing unit in position to be inserted into operative position in the casing.
Figure 2 is an end view of my tenderizing machine showing the cover closed.
Figure 4 is an enlarged sectional detail showing the clutch engaging one end of the shafts which support the tenderizing rollers.
Figure 5 is a perspective detail of the end of the shaft which carries the key portions which are adapted to fit in the clutch of the motor driving unit.

The sectional tenderizing unit B is illustrated in Figure 1 as it would appear when it is being inserted in the recess 11 or removed therefrom.

Figure 8:
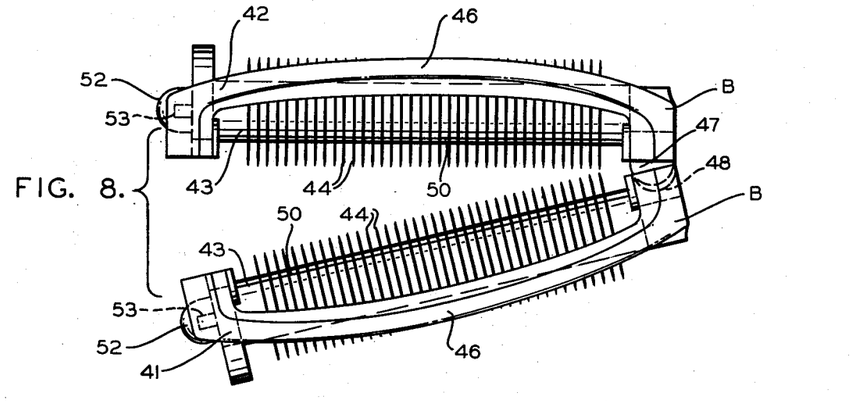
Figure 8 is a plan view looking down on the sections of the tenderizing unit which are spaced apart from each other to illustrate the manner in which the sections are freely separable one from the other by simply moving the sections away from each other.

The sectional tenderizing unit B is made in two sections, 41 and 42, illustrated in plan view in Figure 8, and they are separated from each other to show the manner in which the sections may be separated when the unit B is removed from the recess 11.

Figure 6:
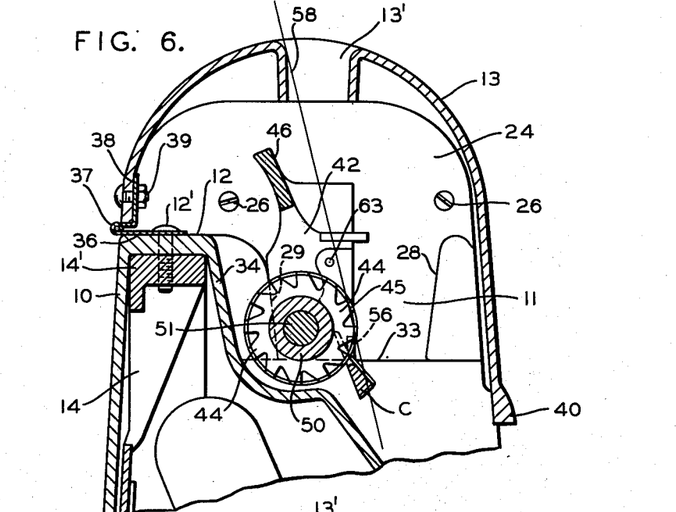
Figure 6 is an enlarged sectional detail showing one section of the tenderizing unit in place supported in the casing of the machine and showing the cover in closed position.
Figure 7:
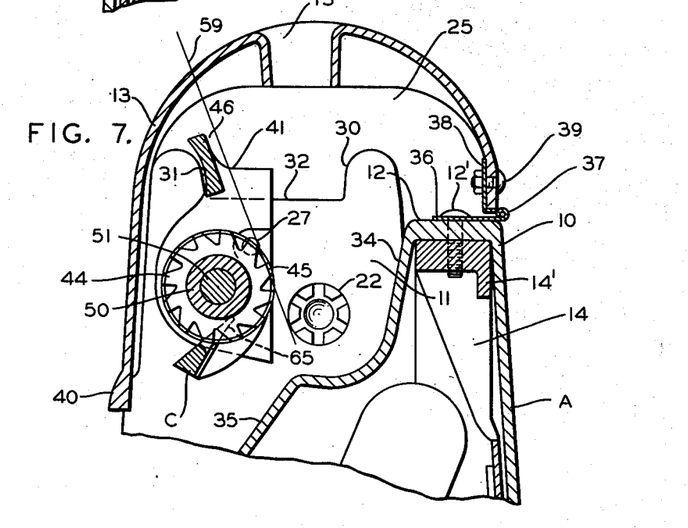
Figure 7 is a similar section to Figure 6 looking in the opposite direction and showing one of the sections of the tenderizing unit supported in position within the casing.

Each section 41 and 42 is provided with a tenderizing roller 43 which is made up of a series of draw cutting knife toothed discs 44. The discs 44 are formed with teeth as illustrated in Figures 6 and 7, which are formed with sharp bevelled ends 45. The cutter discs 44 of the respective tenderizing rollers 43 of each section 41 and 42 rotate toward each other in operation, and the sharp knife-like ends 45 of the teeth of the discs 44 are adapted to make draw cuts in the body of the meat as it is drawn by the processing rollers 43 through the tenderizing unit B. The meat is adapted to be dropped by gravity through the slot 13' in the cover 13. Hand rails 46 which are formed on the top of the frame portions of each of the sections 41 and 42 permit the operator to engage the unit B to lift it from the recess 11 or to insert it therein as illustrated in Figure 1.

The sections 41 and 42 are adapted to be held in alignment with each other by the floating key 47 which is secured to the section 42 and is adapted to fit into the recess 48 formed in the section 41. The outer end of the key 47 is arcuated and the recess 48 is similarly shaped to freely receive the outer end of the key 47.

Figure 9:
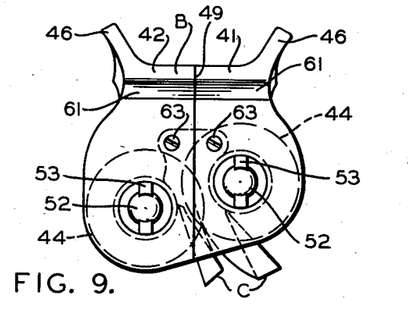
Figure 9 illustrates an end view of the tenderizing unit showing the sections together and looking at the ends of the shafts of the unit which carry the driving keys which engage the clutch of the driving mechanism when the unit is placed in the machine.
Figure 10:
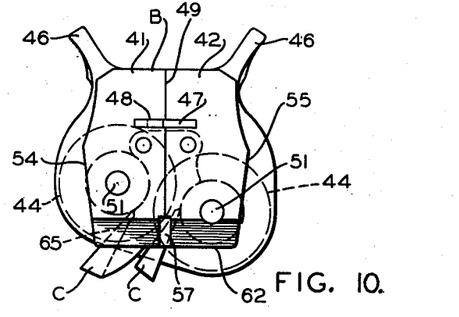
Figure 10 is an end view of the tenderizing unit showing the sections together and held by a floating key and looking in the opposite direction to that shown in Figure 9.
Figure 11:
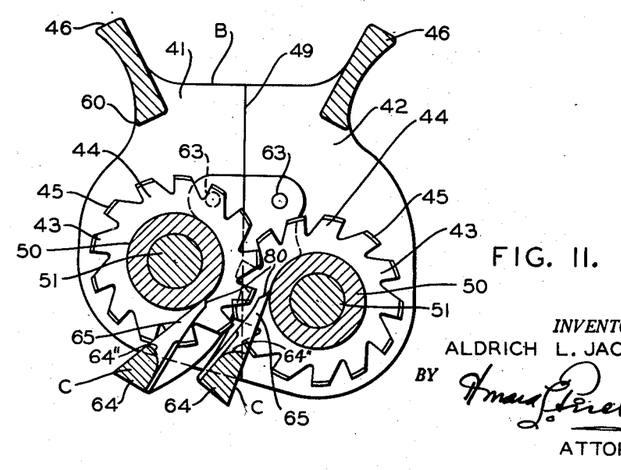
Figure 11 is an enlarged cross section on the line 11—11 of Figure 1, through the tenderizing unit only, when the sections thereof are held engaging each other and showing the position of the floating stripper members in relation to the hubs of the tenderizing rollers.

The end frame portions of the sections 41 and 42 have a meeting or bearing surface 49 which virtually centrally divides the sections and which provides a bearing surface so that the frames of the sections 41 and 42 may bear against each other as illustrated in Figures 9, 10 and 11 when the unit B is assembled.

The rollers 43 are made up of a series of toothed disc cutter blades 44 which blades are spaced apart by the hub washers 50 which rigidly clamp the cutter blades 44 on the shaft 51 of each of the sections 41 and 42. The shafts 51 are mounted in the end plates of the frames of the respective sections 41 and 42, and at one end the shafts 51 project through the plate and are formed with a rounded end portion 52. A pair of keys 53 project from the rounded ends 52 of the shafts. These key portions 53 are adapted to engage the teeth 23 of the clutches 22 which are operated by the motor 20. The outer ends of the teeth 23 are rounded to facilitate the free insertion of the key members 53.

The frames of the sections 41 and 42 are formed with inclined surfaces 54 and 55 respectively, which engage the inclined surfaces 28 and 29 when the unit B is inserted into the recess 11.

A central lug 56 is formed projecting from the shelf 33 and this lug is adapted to fit into the recess 57 formed in the ends of the frames of the sections 41 and 42 which are provided with the inclined surfaces 54 and 55 (as illustrated in Figure 10). The lug 56 is provided to keep the respective sections such as 41 and 42 positioned individually in the recess 11 (as illustrated in Figures 6 and 7). It is desirable that the sections 41 and 42 be individually placed in the recess 11 when it is necessary to sharpen the ends of the teeth of the blades 44, whereupon a three-cornered sharpening instrument may be held approximately on the line 58 (illustrated in Figure 6) or the line 59 (illustrated in Figure 7). The motor 20 may be operated to rotate either of the sections 41 or 42 individually when they are positioned as illustrated in Figures 6 or 7.

The hand rails 46 act as a chute to guide the meat passing through the opening 13' into engagement with the cutter discs 44. These hand rails 46 are formed with lower guard walls 60 which prevent the operator's fingers from coming in contact with the blades 44 during the removal or insertion of the tenderizing unit B.

The unit B is formed with a horizontally projecting shoulder 61 which is adapted to engage the inclined surfaces 30 and 31 and come to rest upon the self 32 to properly place the unit B in working position in the recess 11. The lower edge 62 of the frame sections 41 and 42 which are formed with the inclined surfaces 54 and 55 (as illustrated in Figure 10) is adapted to rest upon the horizontal shelf 33 when the unit B is in working position in the recess 11.

Each of the sections 41 and 42 is formed with floating stripper units C. The units C are pivoted to the respective sections 41 and 42 at 63. These units C are formed with lower bar portions 64 which extend between the ends of the frames of the sections 41 and 42 and which support the hub scraping teeth 65 which project between the blades 44 and engage the hubs 50 to keep the hubs clean and at the same time clean the sides of the blades. The floating stripper units C also act to guide the meat from the processing rollers 43 and as the meat passes between the stripper C it is deposited on the inclined surface 35 as it is discharged from the tenderizing unit B.

The bars 46 are formed with longitudinal ribs 46' to facilitate the gripping of the unit B in removing it or inserting it into the recess 11.

It is of primary importance in my invention to provide a tenderizing unit of a simple construction wherein the casing entirely houses the power unit made up of the motor 20 and the transmission gears 19 with the clutches 22. The cover 13 closes the top of the recess 11 to protect the operator from the tenderizing unit B. Different kinds of meat may be stitched together by dropping the same through the slot 13' which is guided by the rails 46 into the processing rollers 43 which tenderize the meat and stitch it together so that steaks may be made by stitching beef with pork, and steaks may be made out of the meat of fowl such as turkeys, chickens and similar fowl, which steaks may be readily combined with different meats by stitching the meat together and at the same time draw cutting it by the teeth of the blades 44 and thereby tenderizing the meat without crushing it.

A further important feature of my invention resides in the sectional unit B, wherein the sections 41 and 42 may be quickly and easily separated from each other for cleansing when the unit B is removed from the recess 11, and permitting the respective sections to be sharpened individually while the motor is operating.

A further feature of primary importance resides in the manner in which the unit B is automatically locked in the recess 11 by engaging with the inclined shoulders 28 and 29 which engage the surfaces 54 and 55 respectively and by the engagement of the transverse lug 61 which engages the shoulders 30 and 31 to securely position the sections 41 and 42 together while in the recess 11 and in operationg position. This means of joining the free separable sections 41 and 42 is unique in that it holds the sections together as a unit during their operation of tenderizing meat or stitching the same together, and yet the operator may lift the cover 13, engage the rails 46 and remove the sectional unit B from the recess 11 and the clutches 22, and immediately the sections 41 and 42 may be separated (as illustrated in Figure 8), which permits the free access for cleaning of the respective sections or the replacement thereof by other sections whenever it is desired.

Figure 3:
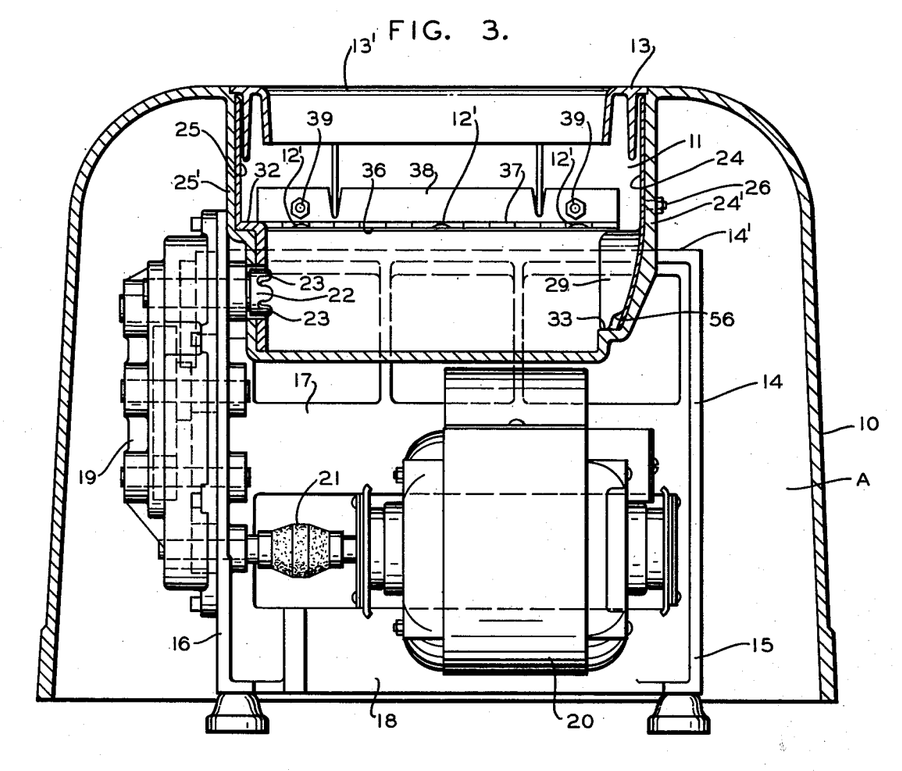
Figure 3 is an enlarged section longitudinally through the casing showing the tenderizing unit removed, the cover of the casing closed, and showing the electric motor with its enclosed chain of driving gears positioned as a unit within the casing.

The simplicity of my tenderizing unit with the novel manner in which I fully enclose the operating parts and protect the operator from the blades of the unit B, and yet providing a receiving recess 31 together with a discharging surface 35, accomplishes a result which is very desirable in a machine of this character. It will be apparent that when the unit B is removed from the recess 11 (as illustrated in Figure 3), the entire recess is accessible for cleaning, and there are no crevices which cannot be readily cleansed when desired. At the same time the power unit including the motor 20 is enclosed and protected. It is very desirable that a meat tenderizer or processing machine of this character be made absolutely sanitary for complete cleansing and inspection at all times.

A further feature of primary importance in my tenderizing unit is the unique manner in which I support the power unit with the motor 20 in the casing 10. The one-piece metal frame 14 is hung from the self 12 of the casing by the same bolts 12' which secure the hinge 37 for the cover 13. Thus a simple and very efficient means of supporting the power unit with the motor 20 and the gear unit 19 is provided. The frame 14 which is formed in a single unitary part provides a strong means of supporting the power unit in a manner so that the casing entirely encloses and separates the power unit from the recess 11 which receives the tenderizing unit B. The motor 20 may be operated by a suitable switch such as D, which may be positioned as illustrated in Figure 1 on the front of the casing or in any other suitable position where it is freely accessible to the operator.

When the unit B is removed, the sections 41 and 42 may be individually placed under a water faucet to thoroughly and effectively cleanse the respective sections of the unit. It is also a feature to separate the sections 41 and 42 from each other to make it easier for the operator to handle the sections when they are removed from the operating position in the recess 11.

It will also be apparent that steaks can be made of different kinds of meat such as beef, veal, ham or pork. Turkey or any other meat from fowl can be processed into steaks by my machine.

It therefore will be apparent that my machine has a wide range of uses and the processing operation tenderizes the meat without destroying the flavor or crushing the juices from the fibers of the meat. These are important features and uses of my meat processing machine.

Figure 12:
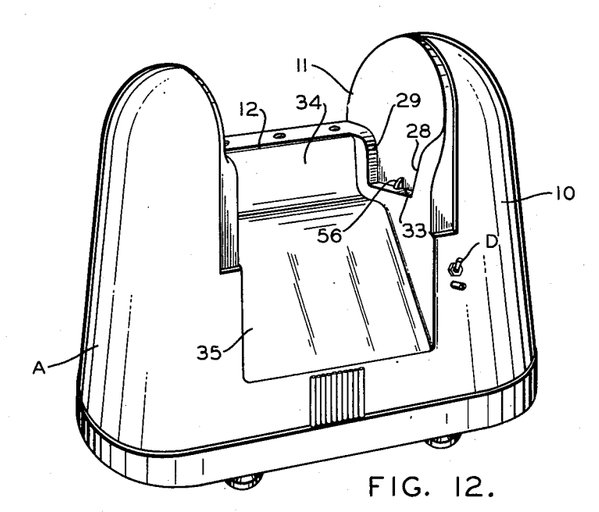
Figure 12 is a perspective view of the casing of my machine showing the cover thereof removed and illustrating the central recess with the forwardly inclined bottom wall and showing one end wall with the recess for receiving the free end of the tenderizing unit.
Figure 13:
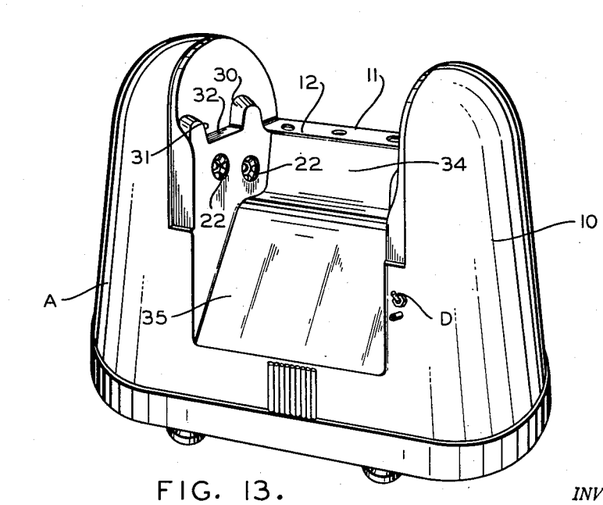
Figure 13 is a perspective view looking toward the front of the casing, with the cover removed and looking toward the opposite end to that shown in Figure 12, to show the recess and shelf for receiving the clutch ends of the shafts of the processing unit.

In Figures 12 and 13 I have illustrated perspective views of the casing to show the end recesses which receive the tenderizing unit B when it is supported in operative position in the casing. In these figures the unit is removed to more clearly illustrate the formation of the recesses. It will be apparent that the casing is provided with smooth inner surfaces in the central recess 11, owing to the integral formation of the casing which is formed in a single piece, and the back walls 34 and 35 which incline forwardly are formed integrally with the casing to provide a smooth finished surface which normally is enamelled with a white smooth surface which can be readily cleaned and kept entirely sanitary at all times. The entire recess 11 with the end walls are freely accessible for cleaning when the unit B is removed from the casing. The blades 12' support the unit frame 14 as well as the hinge 37, and the unit frame 14 supports the electric motor 20 with the transmission 19 which drive the clutch heads 22.

The processing or tenderizing unit B hinges on the key 48 on one end, and the frame sections on the other end bear against each other while the operator engages the handles 46 which maintain the sections of the unit B together, and while thus held the unit can be rocked into position by first engaging the clutch heads 22 with the key ends 52 of the shafts 51, then rocking the free end down into the recess and onto the shoulder 33 with the inclined surfaces 28 and 29 wedging the ends of the frame of the sections together to hold the same locked in operative position. The free end of the unit B is lifted from the shelf 33 and disengaged from the sides 28 and 29 as it is lifted from the casing 10 of the machine. This provides an extremely simple and yet very effective means of supporting the tenderizing unit in the casing.

Figure 14:
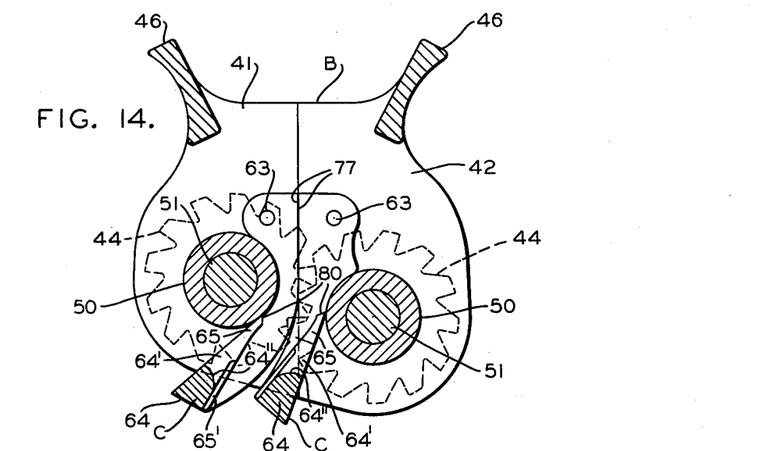
Figure 14 is a section through the tenderizing unit similar to Figure 11, showing the cutter blades in dotted outline and illustrating the floating strippers in full lines with the bar which connects the end plates in section.

In Figure 14 I have illustrated a section through the tenderizing unit B with the cutting blades shown in dotted outline and the floating stripper comb units C illustrated in full lines, with the bar 64 thereof in section.

Figures 15, 16, 17, 18:
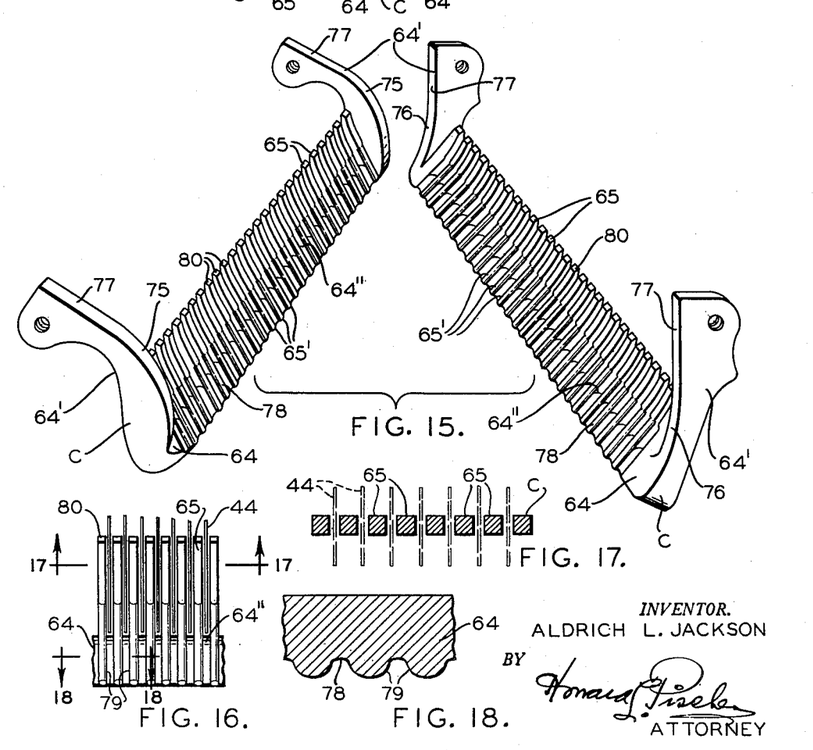
Figure 15 illustrates a perspective view of each of the stripper comb units as they appear removed from the tenderizing unit.
Figure 16 is an enlarged side view of a portion of the stripper comb unit showing the teeth and base bar in detail.
Figure 17 is an enlarged section on the line 17—17 of Figure 15.
Figure 18 is an enlarged section on the line 18—18 of Figure 16.

In Figure 15 I have illustrated both of the floating stripper comb units C removed from the tenderizing unit B.

The comb units C are made up of the series of teeth 65 which scrape the hubs 50 to keep the same clean (as illustrated in Figure 14). The teeth 65 are adapted to project from the bar 64 in each of the comb units C. The lower ends of the fingers 65 are rounded off at 65' which permits the meat passing between the stripper comb units C to readily slide off of the lower free ends of the units C.

The bar 64 connects with the end brackets 64'. The end bracket 64' on one of the comb units C is formed with a convex curved surface 75 while the end bracket 64' on the other unit has a concave surface 76. Above the convex and concave surfaces 75 and 76 respectively on the end plates 64' a flat bearing surface 77 is formed on each of the end plates 64' so that when the stripper units are in operative position (as illustrated in Figure 14) these flat surfaces 77 bear against each other and thereby hold the stripper comb units C spaced apart with the pointed ends of the teeth 65 bearing against the hubs 50.

The stripper comb units C are preferably formed of die castings, being made in a single integral piece in comb-like form with the end plates 64 pivoted at 63 to the end plates of the sections 41 and 42.

Each comb unit C follows with the respective sections 41 and 42 to which it is attached when the sections are removed from the supporting casing in the central recess thereof, as heretofore set forth.

The bar 64 of the respective comb units C forms the base of the respective teeth 65 of the stripper comb units. The teeth 65 fit between the cutter blades 44.

When the unit B is removed from the supporting casing and the respective sections 41 and 42 of the unit are separated from each other, the stripper comb units C may be rotated on their pivot 63 to swing the comb clear of the teeth to permit cleansing of the tenderizing unit B whenever it is desired.

The stripper comb unit C has formed on the inner edge of the bar 64, the rounded shoulder segment portions 64" which direct the strippings of meat inwardly toward the meat receiving surface of the comb and also downwardly as the teeth of the blades 44 pass adjacent the portion 64" which is best illustrated in Figure 14. Without the rounded shoulder portions 64", strippings of meat tend to be carried through with the teeth of the blades 44 and clog up between the teeth and the bar 64 necessitating frequent removal of the meat strippings which is the case where the construction of the base bar is angular and not rounded as the 64".

The teeth 65 blend with and are integral with the base bar 64 as at 78 at which point the teeth are rounded as at 79 thereby reducing the contact surface of the teeth with the meat. After the meat has left the cutting blades 44 and is passing out between the lower portions of the stripper comb C, the surface as at 78 form working surfaces over which the meat slides in its downward course between the stripper combs. The teeth 65 have formed on the free ends thereof, the tapered surface 80, the point of which rests on the hubs 50 and efficiently cleans the same.

I claim:

1. A meat tenderizing machine including a casing having a recess therein, power driven means having clutch means thereon in one end of said casing facing said recess, ledges formed in each end of said casing facing said recess and a separable rotary knife type meat tenderizing unit having two sections in said recess, at least one section of said unit having a clutch means at one end complementary to, and in engagement with, the clutch means in said casing, said sections being adapted to be pulled apart from each other when removed from the casing, the ends of said sections opposite said clutch ends having freely removable interfitting hinge means and the clutch ends fitting snugly against each other when in operative position: means for guiding said unit to, and to assist in maintaining it in, said recess; comprising cam shoulders formed in the ends of said casing facing said recess above said ledges and supporting means on each end of said sections resting upon said ledges.

2. The structure of claim 1 wherein the supporting means on the section ends having the clutch means are lugs near the top of the ends and the means on the other ends comprise the bottom of said end portions.

3. The structure of claim 1 including a lug formed on the ledge opposite the end containing the clutch means and an indentation formed in the hinged end of each section, said lug being adapted to engage each of said indentations in such manner that each of the sections may be maintained separately in the casing.

ALDRICH L. JACKSON.

REFERENCES CITED

The following references are of record in the file of this patent:

UNITED STATES PATENTS

| Number | Name | Date |
| --- | --- | --- |
| 2,163,123 | Huse | June 20, 1939 |
| 2,360,729 | Spang | Oct. 17, 1944 |
| 2,450,688 | Richard | Oct. 5, 1948 |